(12) United States Patent
Van Der Voort

(10) Patent No.: US 6,249,323 B1
(45) Date of Patent: Jun. 19, 2001

(54) WHITE BALANCE CONTROL

(75) Inventor: Victor H. J. Van Der Voort, Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/080,838

(22) Filed: May 18, 1998

(30) Foreign Application Priority Data

May 22, 1997 (EP) .................................................. 97201534

(51) Int. Cl.$^7$ ...................................................... H04N 9/73
(52) U.S. Cl. .......................... 348/655; 348/223; 348/656; 348/713; 358/518; 358/519; 358/520
(58) Field of Search ..................................... 348/223, 655, 348/656, 713; 358/518, 519, 520

(56) References Cited

U.S. PATENT DOCUMENTS

| | | | |
|---|---|---|---|
| 5,289,295 | * 2/1994 | Yumiba et al. ........................ | 358/518 |
| 5,348,601 | * 9/1994 | Yamashita et al. ................... | 348/652 |
| 5,402,182 | * 3/1995 | Sugiura ................................. | 348/655 |
| 5,461,429 | 10/1995 | Konishi et al. ....................... | 348/656 |
| 5,479,204 | * 12/1995 | Iwamatsu ............................. | 348/223 |
| 5,555,022 | * 9/1996 | Haruki et al. ........................ | 348/223 |
| 5,570,129 | * 10/1996 | Hafele et al. ........................ | 348/223 |
| 5,760,831 | * 6/1998 | Tanaka et al. ....................... | 348/223 |
| 6,097,445 | * 8/2000 | Goto et al. ........................... | 348/655 |

* cited by examiner

Primary Examiner—Reinhard J. Eisenzopf
Assistant Examiner—Brian P. Yenke
(74) Attorney, Agent, or Firm—Steven R. Biren

(57) ABSTRACT

In a white balance control, correction signals are added to input chrominance signals (Uin, Vin) to obtain output chrominance signals (Uout, Vout). Chrominance sum signals are derived from the input and output chrominance signals (Uin, Vin ; Uout, Vout) and reference chrominance signals (Uref, Vref). Exponential signals are derived from the chrominance sum signals, and the reference chrominance signals (Uref, Vref) are multiplied by the exponential signals to obtain the correction signals.

6 Claims, 2 Drawing Sheets

WHITE BALANCE CONTROL

Figure 1:
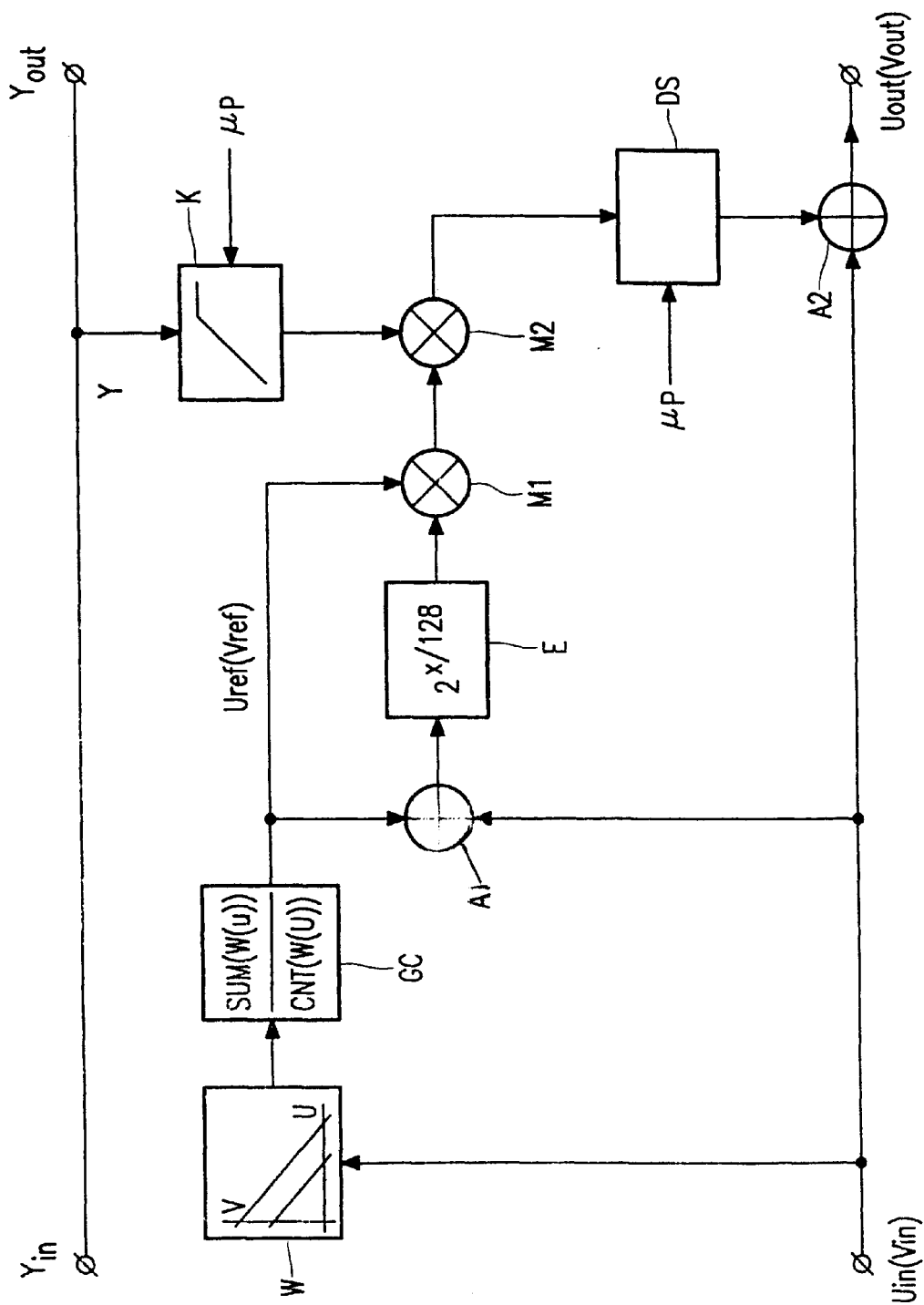

The invention relates to a white balance control method and device, and to a camera comprising such a white balance control device.

U.S. Pat. No. 5,461,429 discloses a white-balance and image-color control device which comprises a white balance coefficient setting unit and a white balance correction coefficient determination unit which determines first and second white balance correction coefficients to be applied to a luminance signal in accordance with the set white balance coefficients. The white balance coefficient setting unit determines a ratio of amplitudes in Red, Green and Blue signals, which will be reflected on the respective white balance coefficients. More specifically, the white balance coefficients can be set by hand with a variable resistor, or they can be set automatically in response to the input signals. How this automatic setting has to be effected is not described in this prior art document.

A luminance signal operation unit obtains first and second correction signals by multiplying the luminance signal by the first and second white balance correction coefficients, respectively. The first and second correction signals are added to first and second color difference signals, respectively.

It is, inter alia, an object of the invention to provide a practical white balance control. To this end, a first aspect of the invention provides a method as defined by claim 1. A second aspect of the invention provides a white balance control device as defined by claim 5. A third aspect of the invention provides a camera comprising such a white balance control device. Advantageous embodiments are defined in the dependent claims.

In a white balance control in which correction signals are added to input chrominance signals to obtain output chrominance signals in accordance with the present invention, chrominance sum signals are furnished from chrominance signals and reference chrominance signals, exponential signals are derived from the chrominance sum signals, and the reference chrominance signals are multiplied by the exponential signals to obtain the correction signals.

These and other aspects of the invention will be apparent from and elucidated with reference to the embodiments described hereinafter.

Figure 2:
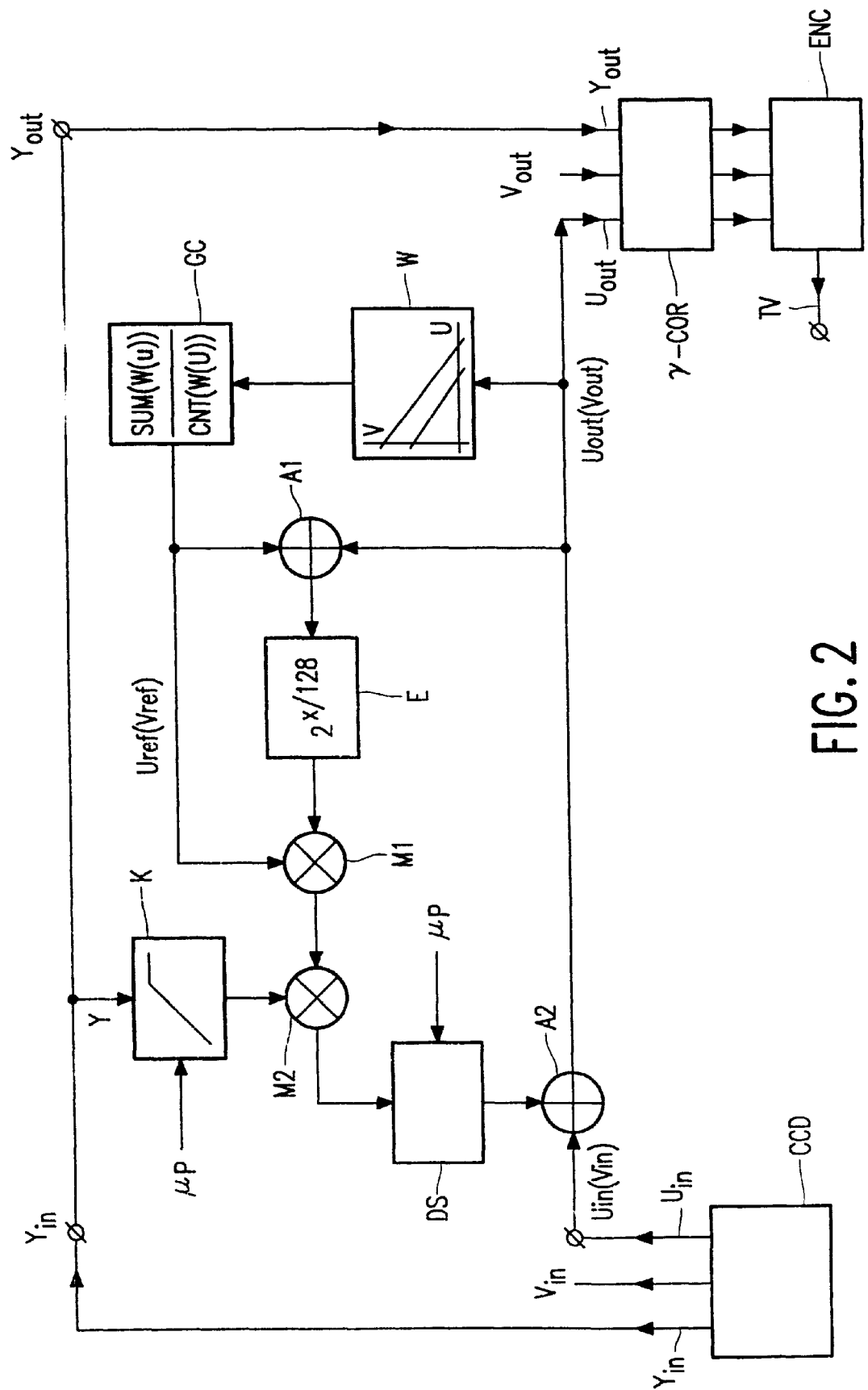

In the drawings:

FIG. 1 shows a first embodiment of a white balance control circuit in accordance with the present invention; and FIG. 2 shows a camera comprising a second embodiment of a white balance control circuit in accordance with the present invention.

In the white balance control circuit of FIG. 1, an input luminance signal Yin is not amended: the output signal Yout equals the input luminance signal Yin. To the input chrominance signals Uin and Vin, respective correction signals are added which are calculated in accordance with the present invention. In the remainder of this description, only the processing of the U chrominance signal will be described; the V signal is processed in an identical manner so that its processing needs no further explanation.

The input chrominance signal Uin is applied to a window circuit W which selects only the colors which are practically white. The window circuit W selects the near white pixels in the two-dimensional UV-domain; of course, in the U processing path only the U values are windowed and in the V processing path (not shown) only the V values are windowed. The white balance control is based on the idea that these colors should be shifted towards white. A point of gravity calculation circuit GC determines an average value Uref which represents the point of gravity of the near-white colors. An adder A1 applies a sum of the input chrominance signal Uin and the average value Uref to an exponential circuit E for calculating $2^{(Uin+Uref)/128}$, where 128 is the maximum value of the U signal (assuming that the U signal is expressed by an 8-bit number). A multiplier M1 applies the product of the average value Uref and the just obtained exponential value, i.e. Uref $*2^{(Uin+Uref)/128}$, to a first input of a second multiplier M2.

A second input of the second multiplier M2 receives a knee-processed luminance value from a knee circuit K to which the luminance signal Y is applied. The knee circuit K operates in accordance with the formulae Knee(Y)=1 if $Y \geq Y_{knee-point}$, and Knee(Y)=Y/$Y_{Knee-point}$ otherwise. The multiplication by the multiplier M2 is optional; it could be relatively large for such a pixel which would result in colorless dark-grey pixels obtaining some color. Therefore, the translation of the chrominance values is preferably scaled to the magnitude of the corresponding luminance value.

The correction value thus obtained is added to the input chrominance value Uin by an adder A2 to obtain the output chrominance signal Uout, after an optional delay and scaling operation in a delay and scaling circuit DS. A microprocessor μP (not shown) regulates the control speed of the circuit by applying control signals to the knee circuit K and the delay and scaling circuit DS.

FIG. 2 shows a camera comprising a second embodiment of a white balance control circuit in accordance with the present invention. This second embodiment largely corresponds to the first embodiment of FIG. 1, except that FIG. 1 shows a feedforward control while FIG. 2 shows a feedback control. No further description of the white balance circuit of FIG. 2 is necessary.

A sensor CCD applies YUV signals to the white balance circuit. Its output signals Yout, Vout and Uout are applied to a gamma correction circuit γ-COR, which furnishes gamma-corrected signals to an encoder ENC to obtain a TV signal TV.

It should be noted that the above-mentioned embodiments illustrate rather than limit the invention, and that those skilled in the art will be able to design many alternative embodiments without departing from the scope of the appended claims. In the claims, any reference signs placed in parentheses shall not be construed as limiting the claim. The invention can be implemented by means of hardware comprising several distinct elements, and by means of a suitably programmed computer.

What is claimed is:

1. A white balance control method, comprising the steps:

determining chrominance sum signals from input or output chrominance signals and reference chrominance signals;

deriving exponential signals from the chrominance sum signals;

multiplying the reference chrominance signals by the exponential signals to obtain correction signals; and adding the correction signals to the input chrominance signals to obtain the output chrominance signals.

2. A method as claimed in claim 1, wherein the reference chrominance signals represent a point of gravity of about-white colors in a UV-domain.

3. A method as claimed in claim 1, wherein the exponential signals are derived in accordance with the expressions $2^{(U_{in}+U_{ref})/128}$ and $2^{(V_{in}+V_{ref})/128}$, where Uin and Vin are the chrominance signals, and Uref and Vref are the reference chrominance signals.

4. A method as claimed in claim 1, wherein the correction signals are scaled to a magnitude of a corresponding luminance signal before being added to the input chrominance signals (Uin, Vin).

5. A white balance control device, comprising:
   means for determining chrominance sum signals from input or output chrominance signals and reference chrominance signals;
   means for deriving exponential signals from the chrominance sum signals;
   means for multiplying the reference chrominance signals by the exponential signals to obtain correction signals; and
   means for adding the correction signals to the input chrominance signals to obtain the output chrominance signals.

6. A camera, comprising:
   a sensor for furnishing luminance and chrominance signals; and
   a white balance control device as claimed in claim 5, coupled to the sensor.

* * * * *